United States Patent [19]

Klein

[11] 4,344,846

[45] Aug. 17, 1982

[54] FILTRATION USING EXPANDED STYRENE-POLYMER AND POLYOLEFIN MICRO-BITS

[75] Inventor: Max Klein, 257 Riveredge Rd., Tinton Falls, N.J. 07724

[73] Assignee: Max Klein, Shrewsbury, N.J.

[21] Appl. No.: 150,736

[22] Filed: May 19, 1980

Related U.S. Application Data

[63] Continuation-in-part of Ser. No. 833,644, Sep. 15, 1977, Pat. No. 4,207,378, which is a continuation-in-part of Ser. No. 342,535, Mar. 16, 1973, abandoned.

[51] Int. Cl.³ .................... B01D 39/04; B01D 39/06
[52] U.S. Cl. .................................................. 210/503
[58] Field of Search ................. 252/60; 210/777, 778, 210/173, 174, 193, 503, 505, 500.1

[56] References Cited

U.S. PATENT DOCUMENTS

| | | | |
|---|---|---|---|
| 2,055,869 | 9/1936 | Manning | 210/777 |
| 3,037,635 | 6/1962 | Boorujy | 210/778 |
| 3,178,021 | 4/1965 | Bray | 210/277 |
| 3,259,571 | 7/1966 | Marshall | 210/778 |
| 3,274,103 | 9/1966 | Adams | 210/505 |
| 3,327,859 | 6/1967 | Pall | 210/503 |
| 3,707,398 | 12/1972 | Charlesworth | 210/777 |
| 3,812,031 | 5/1974 | McCoy | 210/505 |
| 3,880,754 | 4/1975 | Brost | 210/505 |
| 4,070,287 | 1/1978 | Wiegand | 210/505 |
| 4,145,284 | 3/1979 | Neu | 210/503 |

FOREIGN PATENT DOCUMENTS

| | | | |
|---|---|---|---|
| 2906998 | 8/1979 | Fed. Rep. of Germany | 210/505 |
| 52-65969 | 5/1977 | Japan | 210/505 |
| 1260466 | 1/1972 | United Kingdom | 210/778 |

*Primary Examiner*—Ernest G. Therkorn
*Attorney, Agent, or Firm*—Dann, Dorfman, Herrell and Skillman

[57] ABSTRACT

Disclosed is (a) a filtration method using (i) micro-bits produced from an expanded thermoplastic polymer non-brittle in expanded form and selected from a styrene-polymer and a polyolefin from polyethylene to poly-methylpentene or (ii) mixtures of these micro-bits and inorganic filter aids as diatomaceous earth and perlite, and (b) these filter aid mixtures. These micro-bits and mixtures are useful filter aids in several different ways. One is to prepare a slurry of them in a liquid medium and feed this slurry to a filter element (as fabric filter cloth or wire filter cloth or ceramic filter) to provide on that element's feed side a precoat of the filter aid and liquid leaves as filtrate from its filtrate side.

In another way these micro-bits and mixtures are used by being admixed into the liquid (inert to them) containing finely divided material suspended or dispersed in the liquid and to be removed. Also, these micro-bits alone or mixture with diatomaceous earth or perlite can be admixed into the liquid medium. Another way to use the micro-bits or their mixture is by using the precoat route and with the liquid dispersion to be filtered containing in it these micro-bits alone or admixed with any inorganic filter aid.

6 Claims, No Drawings

FILTRATION USING EXPANDED STYRENE-POLYMER AND POLYOLEFIN MICRO-BITS

This application is a continuation-in-part of my copending allowed patent application Ser. No. 833,644 filed Sept. 15, 1977, now U.S. Pat. No. 4,207,378, which application in turn was a continuation-in-part of the then copending application Ser. No. 342,535 filed Mar. 16, 1973 (now abandoned).

This invention is that of (a) a filtration method using as a filter aid micro-bits of an expanded (and non-brittle in its expanded form) thermoplastic polymer selected from a styrene-polymer and a polyolefin from polyethylene to poly-methylpentene, and (b) filter aid mixtures of these micro-bits and any of the inorganic filter aids (e.g. diatomaceous earth, perlite or silica).

The filter aid mixtures of the invention contain from about 1 to about 50 parts of the micro-bits to from about 99 to about 50 parts of inorganic filter aid, and are prepared by ordinary mixing of any of the micro-bits with any of the inorganic filter aids.

These micro-bits are described more fully further below. They may be referred to briefly as expanded thermoplastic styrene-polymer or polyolefin micro-bits or as "vinyl-polymer micro-bits" or merely as "these micro-bits".

The filtration method of the invention involves removing from a liquid medium (inert to these vinyl-polymer micro-bits) material dispersed in it and which is to be removed therefrom, by use of these micro-bits and allowing the liquid medium to pass through a filter element that takes on the micro-bits on its inlet surface while allowing the liquid filtrate to leave from the filtrate side of the filter element. The filtration method of the invention is variously applicable, for example, in filtering and improving the quality of fluids, both liquid and gaseous.

For many years filtration was used to remove finely divided particles from various liquid media in different chemical and water treatment operations, either by direct filtration or combined with preliminary chemical treatment such as producing flocculation to enhance removal of dispersed particles not readily removed by direct filtration.

For a long time the speed and efficiency of the filtering has been a desirable goal in filtration procedure. An early assist in that direction was to use a filter aid, as which diatomaceous earth or perlite commonly was used. The filtration method of this invention aids in meeting that goal.

The nature and characteristics of the vinyl-polymer micro-bits used in this filtration method are described in allowed patent application Ser. No. 833,644 on its page 1 lines 3–6 and line 9 to page 2 line 7, page 4 line 18 to page 6 line 5, page 10 line 20 to page 11 line 7, page 15 lines 17 to 21, and page 20 lines 19 to 22, all in relation to its drawings, and to the description of them on page 4 line 20 to the end of page 5, of that application.

Specifically, these polymer micro-bit particles range in size from about 325 microns to about 40 microns in length and from about 325 microns to about 20 microns or less in width, have a specific gravity of from about 85 percent of, to substantially the same as, the starting polymer which was expanded and then disintergrated to form the micro-bits, are from substantially completely to entirely completely free of intact cells of the expanded polymer from which they are produced, and lack uniformity of outline.

These vinyl-polymer micro-bits used in the filtration method of this invention are produced from expanded bit-pieces of a thermoplastic styrene-polymer or of an applicable thermoplastic polyolefin (from polyethylene to poly-methylpentene) by the method described in that application Ser. No. 833,644 page 6 line 6 to page 7 line 5, page 11 line 8 to page 12 line 17, Examples 1 and 2 on its page 13 line 6 to page 15 line 10 and page 16 line 3 to page 20 line 6.

That application Ser. No. 833,644 (page 2 lines 8 to 28) explains what the expression "a styrene-polymer" embraces. That application (at its page 2 line 29 to page 3 line 8) also relates what is intended by the term "polyethylene" in the expressions "an expanded polyethylene" and "a polyethylene".

The polyolefin is a polymer of an ethylenically unsaturated hydrocarbon monomer having from 2 to 6 carbon atoms such as polypropylene, a polybutylene and a polypentene.

Included with this group of polyolefins is a melt alloy of polyethylene with about 10 percent by weight of polystyrene, a copolymer of polypropylene with from about 20 to about 30 percent of polyethylene by weight, and a melt alloy of polypropylene and polyvinyl acetate to the extent of up to about 30 percent.

That application Ser. No. 833,644, page 3 line 9 to page 4 line 17 relates what the term "bit-pieces" includes and how styrene-polymer bit-pieces and polyolefin bit-pieces can be prepared.

The just referred to method of preparing the micro-bits used in the filtration method of the invention is carried out on the apparatus described in application Ser. No. 833,644 page 7 line 3 to page 9 line 7, page 12 lines 16–17 and page 15 lines 11 to 14, page 16 lines 10–11, page 18 to page 19 line 16, page 20 lines 1 to 18 and page 22 line 14 to page 23 line 4.

All of the foregoing referred to portions of that application Ser. No. 833,644 are incorporated herein by reference as if they are written out in full herein.

The particular method of preparing the styrene-polymer and polyolefin micro-bits provides them as substantially completely to entirely completely free of intact cells of the corresponding starting expanded thermoplastic styrene-polymer and polyolefin bit-pieces from which these micro-bits were produced and with a variety in outline of the individual micro-bits. These micro-bits (as obtained from the equipment which produced them) are readily suitable for use in filtering aqueous or other liquid dispersions inert to these polymer micro-bits.

Considered broadly, the method of the invention involves removing from a liquid (inert to these micro-bits) containing dispersed material therein to be removed therefrom by filtration, which method includes the step of contacting the liquid with a filtration effective amount of any of these thermoplastic expanded styrene-polymer and polyolefin micro-bits sufficient to remove that dispersed material, and filtering off the liquid from its contact with these micro-bits. The filtration is continued for a sufficient time to remove the undesired material from the starting liquid dispersion.

The liquid medium containing dispersed material and involved in the filtration method of the invention can be any liquid which is inert to these styrene-polymer and polyolefin micro-bits, and more often can be water.

Contact of the liquid to be filtered with the micro-bits may be conducted in any of several different manners. For example, a filtration sufficiently thick layer of the expanded thermoplastic styrene-polymer and/or polyolefin micro-bits can be deposited as a filter layer or precoat on a liquid permeable or porous filter element or support capable of retaining the filter layer or precoat of these micro-bits and at the same time to permit free passage of the liquid filtrate. Such support or filter element can be, for example, a fabric filter cloth or wire filter cloth or a ceramic filter such as porous porcelain as a Büchner funnel or a fiber glass cloth filter or fritted glass filter.

Such filter element can be used, for example, in a plate and frame filter press or rotary vacuum filter, or supported on the porous bottom of a non-porous cylinder or in a Seitz filter.

The liquid to be filtered then on leaving contact with the micro-bits would continue on through the porous filter element or filter support.

The liquid medium containing the dispersed material to be removed cam contact the vinyl-polymer micro-bits (a) by being admixed as a filter aid in the body of the liquid and in a sufficient quantity to accomplish the removal of the material to be removed from the resulting mixture which then is to be fed on to the filter element (which mixture thus fed is called body feed), or (b) by being fed through a precoat of the micro-bits deposited on a suitable filter element such as any of those shortly above described, as in a plain filter press or rotary vacuum filter, or in a Seitz filter or a vertical column filter by gravity or pressure direct or the result of suction.

The method of the invention including use of the styrene-polymer or polyolefin micro-bits as a filter aid can be modified to advantage by using the micro-bits to replace from about 1 to about 15 percent by weight, and often optimally to about 10 percent, of an inorganic filter aid such as diatomaceous earth (or perlite or silica) serving as the major in quantity filter aid constituent.

The method of the invention is illustrated by, but not restricted to, the examples below, wherein, for example, the combined paper mill waste water (from several paper making machines in the production of various types of primarily writing and printing paper) containing about 100 parts per million of organics (e.g. starch, stearates, wetting agents, colloidal substances as melamine formaldehyde resin, sub-micron size cellulose fibers) and inorganics (such as micron size titanium dioxide, and other additives commonly charged into the paper making beater), was used as the starting liquid medium containing materials dispersed in it and to be removed by use of the styrene-polymer and/or polyolefin micro-bits in the method of the invention.

This paper mill effluent was filtered by the method of this invention, including the use of the styrene-polymer and/or polyolefin micro-bits, through a filter element, which is a proprietary filter mat composed of cotton rag fibers intertwined with expanded polystyrene micro-bits with a minor amount of a terephthalate polyester fibers and intermeshed activated carbon black (as more fully described below), in the form of a 6 centimeter (cm.) disc held clasped, as the filter element, in a Seitz filter, and in each case at a vacuum of 38.1 cm. Hg (mercury).

This foregoing paper mill effluent showed a starting turbidity of at least 600 JTU (Jackson turbidity units), i.e. the reading went higher than the scale of the instrument, on a sample taken from the overall sampling uniform withdrawal at a slow rate from the effluent over the course of the 24 hour day. Tap water ordinarily shows a turbidity of about 10 JTU, rarely over that and usually under, and is clear to the eye. Distilled water shows a turbidity of 0 JTU.

Filtering 200 milliliters (ml.) of this paper mill effluent through the 6 cm. diameter mat in the Seitz filter at the 38.1 cm. Hg vacuum required 157.6 seconds.

EXAMPLE 1

Using Expanded Polystyrene Micro-Bits As Precoat

One gram (gm.) of expanded polystyrene micro-bits was admixed in 200 ml. of the distilled water in a Waring blender. The resulting slurry was filtered through the Seitz filter under vacuum of 38.1 Hg and provided a uniform firm precoat of the micro-bits over the 6 cm. diameter disc of the proprietary filter mat. Then 200 ml. of the earlier above described paper mill effluent was filtered through that precoat of polystyrene micro-bits (on the proprietary mat) in the Seitz filter and required 30.5 seconds for completion. The resulting filtrate water showed a turbidity of 0 JTU.

EXAMPLE 2

Polystyrene Micro-Bits Enhancing Diatomaceous Earth As A Precoat (a) A slurry of one gm. of diatomaceous earth admixed in 200 ml. of distilled water was prepared in the Waring blender. The slurry then was filtered through a fresh same diameter disc of the proprietary filter mat in the Seitz filter under the same vacuum as in Example 1 and provided a uniform firm precoat. Then filtering 200 ml. of the same paper mill effluent through the diatomaceous earth precoat in the Seitz filter required 46.5 seconds for completion. The turbidity of the filtrate was 6 JTU.

(b) A slurry of 0.9 gm. of the diatomaceous earth admixed with 0.1 gm. of the expanded polystyrene micro-bits in 200 ml. of water was prepared in the Waring blender. That slurry then was filtered similarly through a fresh disc of the proprietary filter mat in the Seitz filter under the same conditions as in (a) and thus provided uniform, firm precoat of the diatomaceous earth and the micro-bits on the mat. Then filtration of 200 ml. of the same paper mill effluent through this precoat of mixed 0.9 gm. of diatomaceous earth and 0.1 gm. of the expanded polystyrene micro-bits required only 26.2 seconds for completion. The filtrate's turbidity was 4 JTU.

Thus, replacing 10 percent of the diatomaceous earth by the same amount of the expanded polystyrene micro-bits reduced the filtration time through the mixed precoat by 43.7 percent, or to 56.3 percent, of the time required by using the diatomaceous earth alone and with significantly reduced turbidity.

EXAMPLE 3

Use Of Precoat Of Diatomaceous Earth With Less Polystyrene Micro-Bits

Example 2 (b) was repeated by preparing a precoat of a mixture of 0.99 gm. of the diatomaceous earth admixed with 0.01 gm. of the polystyrene micro-bits on a fresh piece of the proprietary filter mat in the Seitz filter. Filtration of 200 ml. of the same paper mill effluent through this precoat containing only 1 percent of the polystyrene micro-bits required 29.9 seconds for completion and the turbidity of the filtrate also was 4 JTU.

Thus, replacing even only 1 percent of the diatomaceous earth by the expanded polystyrene micro-bits reduced the filtration time by as much as 35.7 percent, or to 64.3 percent, of that elapsed when diatomaceous earth alone was used, and also with the same significant reduction in turbidity as occurred when polystyrene micro-bits replaced 10 percent of the diatomaceous earth.

EXAMPLE 4

Filtration With Precoat Of Diatomaceous Earth Admixed With Expanded Polyethylene Micro-Bits Part (b) of Example 2 was repeated but by replacing its 0.1 gm. of the polystyrene micro-bits by 0.1 gm. of expanded polyethylene micro-bits. Filtration of the 200 ml. of the paper mill effluent through the precoat of the admixed diatomaceous earth and polyethylene micro-bits required only 31.3 seconds and the filtrate turbidity was 8 JTU.

Thus, replacing 10 percent of the diatomaceous earth by the same amount of expanded polyethylene micro-bits reduced the filtration time through the precoat of admixed diatomaceous earth and polyethylene micro-bits by 32.6 percent, or to 67.3 percent, of the filtration time through a precoat of diatomaceous earth alone.

Example 2 (b), 3 and 4 show that the thermoplastic expanded styrene-polymer and polyolefin micro-bits provide an unexpected advantage in enhancing filtration rate, for example, by admixture in a low percentage with an inorganic filter aid such as diatomaceous earth.

Also surprisingly, use of these micro-bits increases the extent to which filtration can continue through filter media. That is illustrated by, but not restricted to, the following example:

EXAMPLE 5

Filtration Through Admixed Polystyrene Micro-Bits And Diatomaceous Earth

Through a plate filter press having circular frames supporting 4 spaced apart filter mats (of proprietary constitution) having a filtration area diameter of 29.21 cm. (and thus 663 square cm. of available filtration area for each section) there was fed at a starting rate of 28.4 liters per minute the above noted paper mill waste water effluent. At the end of 3.1 hours the filtrate was leaving the filter press at a rate of only about 0.4 liter per minute.

The thus used 4 sections of the filter mat were removed and replaced by fresh pieces. Through the filter press containing these fresh pieces there then was fed a homogeneous suspension of 210 grams of the popular grade of filter aid quality diatomaceous earth in 11.4 liters of water at a rate to filter 43.5 liters per minute until a 6.3 mm. thick layer of it was deposited on each of these filter mats. Promptly before shutting off the aqueous suspension of the micro-bits and filter aid, there was substituted a stream of the same paper mill waste water effluent at a rate of 43.5 liters per minute. However, in about 8 minutes the discharge of filtrate from the filter press was completely blocked off.

The filter mats from this last filtration were removed and replaced by fresh pieces of the same filter mat. Through these fresh pieces there was filtered a homogeneous suspension of the mixture of 210 grams of the diatomaceous earth filter aid and 150 grams of the thermoplastic expanded polystyrene micro-bits in 11.4 liters of water until a 6.3 mm. thick precoat of the admixed micro-bits and diatomaceous earth was deposited on the filter mat pieces.

Then, promptly before cutting off the stream of that mixture of micro-bits and filter aid there was substituted at the rate of 43.5 liters per minute the same paper mill waste water effluent and the filtration continued for about 5 hours and 50 minutes with the filtrate discharging at a rate of 2.65 liters per minute when the run had to be concluded at the end of the working day. By that time the filtration through the precoat mixture of diatomaceous earth and polystyrene micro-bits had already run 2 minutes short of 44 times, and could have continued still longer than, the only about 8 minutes before when filtration was completely blocked off through the precoat of the diatomaceous earth alone.

The filtration method of the invention can remove from an aqueous medium what appears to be dissolved or invisibly suspended organic material prone to bacteria-like growth and ordinarily leave the filtered liquid free from development of such growth even after long standing. That is illustrated by, but not restricted to, the following:

EXAMPLE 6

Filtration Of Municipality Tap Water

The municipality tap water in Matawan, N.J., was filtered through a Whatman No. 2 filter paper to the extent of 473.2 cc. into a first clean, 946.3 cc. Mason jar which then was tightly sealed. 0.4 grams of the expanded polystyrene micro-bits were wetted with about 20 cc. of this same tap water and admixed with about 473.2 cc. more of the tap water and then filtered through another Whatman No. 2 filter paper into a similar second clean, 946.33 Mason jar and tightly sealed.

A week later a slight yellow haze was noted in the first jar, but the water (which had been admixed with the micro-bits) in the second jar still was perfectly clear. The yellow haze in the first jar increased in amount and in density, with later settling to the bottom of the jar during observation over a period of three months. Yet the water that had been filtered through the polystyrene micro-bits into the second jar still was perfectly clear at the end of that period.

The expanded polystyrene micro-bits in this example thus filtered from the municipal water supply the colloidally dispersed organic material which otherwise would have been available as nutrient to bacterial organism growth in the water.

EXAMPLE 7

Filtering Rotary Biological Contactor Effluent Through Micro-Bits To Dewater Sewage Sludge The effluent (containing about 0.6% solids) from the processing, in a rotary biological contactor (briefly called RBC), of a pretreated municipal sewage stream was fed through a high pressure, plate and frame filter press to remove the suspended solids. The filter press was a Von Roll model 360 with two 12 by 12 by 1 inch frames carrying the commonly used filter cloth.

(a) The RBC effluent fed through this filter press after 10 minutes of filtration reached a pressure of 95 psig (i.e. pounds per square inch gage) and 18.1 liters of filtrate had accumulated. After continuing the filtration for a total of 110 minutes the final pressure reached 225 psig and a total of 55.1 liters of filtrate was obtained. The filter cake showed a density of 67 pcf (i.e. pounds per cubic foot), a solids content of 20% and an "R" meter value of $1.4 \times 10^9$ sec.$^2$ per gm.

The "R" meter value is well known as being the specific resistance. The meter is described in Metcalf & Eddy, Inc "Waste Water Engineering", McGraw Hill Co., New York, N.Y. (1972) page 306.

(b) After the filter press had been cleaned out, its clean filter cloths were precoated with 0.5 pound of the expanded polystyrene micro-bits by filtration and without interruption of liquid flow the RBC effluent was fed, as in run (a), into the filter press with its filter cloths as just previously precoated. After 10 minutes of filtration, the pressure was only 55 psig and 52.3 liters pf filtrate had accumulated. After a total of only 35 minutes of filtration, 68.5 liters of filtrate had been collected. With this better result, the filtration was stopped. The filter cake showed density of 64 pcf (which accounted for the more rapid filtration), solids content of 27% and "R" value of $0.83 \times 10^9$ sec.$^2$ per gm.

Comparing the results between runs (a) and (b) shows that using the micro-bits precoat provided a 40.7 drop in specific resistance with consequent much more rapid filtration yielding more filtrate in shorter time and under lesser pressure.

Still other beneficial filtrations illustrate the method of the invention. For example, illustrating use in filtering and improving a gaseous fluid, the off-white filter was removed from a commercial cigarette (Kent brand) and cut into three equal parts. One part was replaced into the innermost portion of the filter zone, dry micro-bits of expanded polystyrene were inserted into the next third of the filter zone, and another third of the original filter was replaced in the remainder of the filter zone. The cigarette was then smoked down to within a quarter inch of the filter tip.

On opening the filter zone the innermost portion of the original filter had changed from its original off-white color to only a light brown amber. The middle portion consisting of micro-bits of expanded polystyrene was black and slimy to the touch; and the outermost portion of the original filter material had not changed in color.

Comparative liquid and gas filtering results are provided by micro-bits of a polyethylene and even better on use in a cigarette filter. Micro-bits of the other polyolefins are similarly useful.

Environmental air can be filtered through air filters wherein the packing includes micro-bits of any of the expanded styrene-polymers and the applicable expanded polyolefins, for example, admixed with suitable paper-making fibers and then processing the resulting mixture into sheets to be fitted into air filter frames.

Application Ser. No. 833,644 (page 11 lines 20-27) relates that the comminuted polymer micro-bits leaving the comminutor (wherein they are produced) have the property of holding on to water to the extent of from about 40 to 50 times their dry weight and so form a non-fluid plastic mass, from which the water is not released by drainage or ordinary filtration.

Hand sample paper sheets prepared, in a customary hand sample sheet mold, by mixing the just described plastic mass of any of the obtained expanded styrene-polymer or polyolefin micro-bits with a usual water suspension of bleached wood pulp, showed significantly great improvement in tear, tensile strength, rupture resistance, opacity, bulking efficiency and stiffness over that of hand sheets similarly made from the bleached pulp alone in the same concentration as that of the pulp admixed with the polymer micro-bits.

The polystyrene micro-bits used in any of Examples 1 to 7 can be replaced by a respectively effective amount of any other of the hereinabove referred to applicable expanded styrene-polymer micro-bits. Also, any polyolefin micro-bits said to be applicable in any of the examples can be replaced by a respectively effective amount of any of the other earlier above described applicable expanded polyolefin micro-bits including also the identified polyolefin melt allows and copolymers. Then too, the diatomaceous earth used in any of Examples 2 to 5 can be replaced by a respectively equivalent amount of any of the other inorganic filter aids compatible with the micro-bits and the liquids which are to contact the filter aids.

The polyester used in the earlier above mentioned proprietary filter mat is the semi-dull, optically whitened polyethylene terephthalate polyester available as the TREVIRA 101 product of American Hoechst Corporation, Fiber Division, Spartanburg, S.C. 29301.

While the invention has been explained by the detailed description of certain specific embodiments of it, it is understood that various modifications and substitutions may be made within the scope of the appended claims which are intended also to cover equivalents of these embodiments.

What is claimed is:

1. A filter aid composition consisting essentially of from about 90 to about 99 parts of an inorganic filter aid material having admixed therewith from about 1 to about 10 parts of polymer micro-bits produced from the group of an expanded styrene-polymer, or an expanded polyolefin, which is the polymer of an ethylenically unsaturated hydrocarbon monomer having from 2 to 6 carbon atoms, each said polymer being non-brittle in the form used to produce said micro-bits, said micro-bits being from about 325 to about 40 microns long and from about 325 to about 20 microns wide in particle size, from substantially completely to entirely completely free of intact cells of the expanded polymer from which said micro-bits are produced, substantially without any uniformity in outline of the individual micro-bit particles, and having a density from about 85 percent of, to substantially the same as, the specific unexpanded polymer from which there was provided the aforesaid expanded polymer from which said micro-bits are produced.

2. The composition as claimed in claim 1, wherein the micro-bits are those of a styrene-polymer.

3. The composition as claimed in claim 2, wherein the styrene-polymer is polystyrene.

4. The composition as claimed in claim 1, wherein the micro-bits are those of a polyolefin.

5. The composition as claimed in claim 4, wherein the polyolefin is polyethylene.

6. The composition as claimed in any of claims 2 to 5 and 1, wherein the inorganic filter aid is diatomaceous earth.

* * * * *